(12) United States Patent
Ohashi et al.

(10) Patent No.: US 11,085,816 B2
(45) Date of Patent: Aug. 10, 2021

(54) ULTRASONIC WAVE SENSOR AND ULTRASONIC WAVE DEVICE

(71) Applicant: Seiko Epson Corporation, Tokyo (JP)

(72) Inventors: Koji Ohashi, Matsumoto (JP); Chikara Kojima, Matsumoto (JP)

(73) Assignee: Seiko Epson Corporation

(*) Notice: Subject to any disclaimer, the term of this patent is extended or adjusted under 35 U.S.C. 154(b) by 273 days.

(21) Appl. No.: 16/366,174

(22) Filed: Mar. 27, 2019

(65) Prior Publication Data

US 2019/0301926 A1 Oct. 3, 2019

(30) Foreign Application Priority Data

Mar. 28, 2018 (JP) .............................. JP2018-061555

(51) Int. Cl.
*G01H 11/08* (2006.01)

(52) U.S. Cl.
CPC .................................... *G01H 11/08* (2013.01)

(58) Field of Classification Search
CPC .............................. B06B 1/0622; G01H 11/08
USPC .......................................................... 367/180
See application file for complete search history.

(56) References Cited

U.S. PATENT DOCUMENTS

| | | | |
|---|---|---|---|
| 6,381,197 B1 * | 4/2002 | Savord .................. | B06B 1/0292 367/178 |
| 2002/0073781 A1 | 6/2002 | Hashimoto et al. | |
| 2007/0299345 A1 | 12/2007 | Adachi et al. | |
| 2014/0113828 A1 * | 4/2014 | Gilbert .................. | H01L 39/225 505/100 |
| 2014/0241112 A1 | 8/2014 | Kano | |
| 2016/0284973 A1 | 9/2016 | Ohashi | |

FOREIGN PATENT DOCUMENTS

| | | |
|---|---|---|
| JP | H08-084397 A | 3/1996 |
| JP | 2000-341796 A | 12/2000 |
| JP | 2001-309493 A | 11/2001 |
| JP | 2004-057460 A | 2/2004 |
| JP | 2006-122188 A | 5/2006 |
| JP | 2012-039495 A | 2/2012 |

(Continued)

OTHER PUBLICATIONS

"Driven element," Wikipedia, 2021, downloaded Feb. 21, 2021 from https://en.wikipedia.org/wiki/Driven_element, 2 pages (Year: 2019).*

*Primary Examiner* — Daniel L Murphy
(74) *Attorney, Agent, or Firm* — Harness, Dickey & Pierce, P.L.C.

(57) ABSTRACT

An ultrasonic wave sensor includes an oscillating plate including a plurality of oscillators, a wall portion provided on the oscillating plate and surrounding the oscillator, and a piezoelectric element provided on each of the plurality of oscillators. In the oscillating plate, a plurality of piezoelectric elements are electrically connected in plan view as viewed from a thickness direction, and a first area where an input and an output of a drive signal to the piezoelectric element are possible and a second area which is provided on an outer side of the first area and where the piezoelectric element is electrically insulated from the piezoelectric element disposed in the first area are included. In the second area, a distance between the adjacent oscillators is reduced as separated from the first area.

8 Claims, 8 Drawing Sheets

(56) References Cited

FOREIGN PATENT DOCUMENTS

| JP | 2014-161707 A | 9/2014 |
|---|---|---|
| JP | 2016-184821 A | 10/2016 |
| JP | 2017-034057 A | 2/2017 |

* cited by examiner

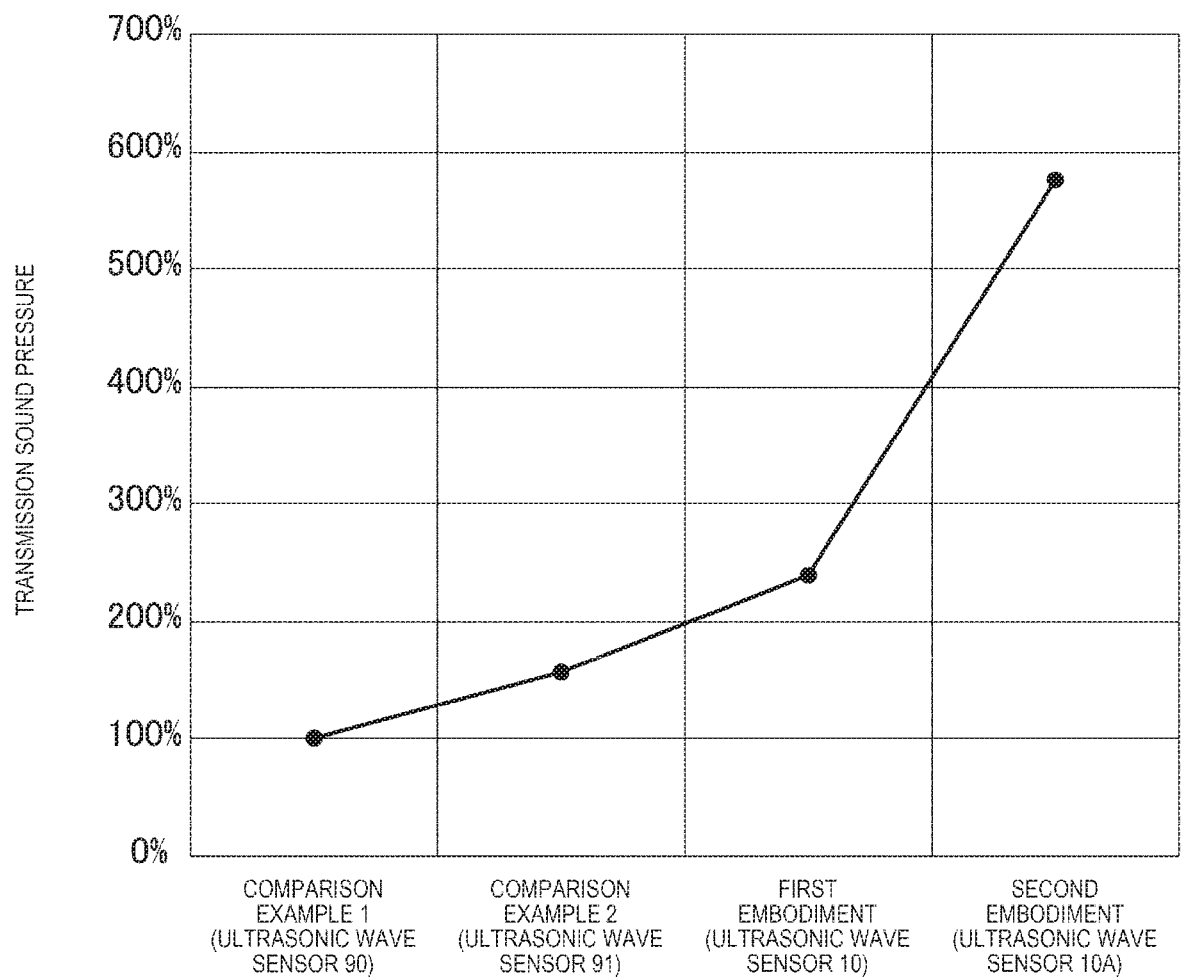

ULTRASONIC WAVE SENSOR AND ULTRASONIC WAVE DEVICE

BACKGROUND

1. Technical Field

The present invention relates to an ultrasonic wave sensor and an ultrasonic wave device.

2. Related Art

In the related art, an ultrasonic wave sensor that transmits and receives an ultrasonic wave by oscillating an oscillating plate is known (for example, JP-A-2017-34057).

In the ultrasonic wave sensor disclosed in JP-A-2017-34057, an oscillation film and an ultrasonic wave transducer configured by including a piezoelectric element disposed on the oscillation film are disposed in a matrix in an XY direction. In the ultrasonic wave sensor, an ultrasonic wave transducer column (channel) is configured of each ultrasonic wave transducer disposed along a Y direction among a plurality of the ultrasonic wave transducers and a plurality of the channels are disposed along an X direction.

In the ultrasonic wave sensor disclosed in JP-A-2017-34057, it is considered that the number of ultrasonic wave transducers (the number of elements) included in one channel is increased in order to increase a sound pressure of the ultrasonic wave transmitted from the ultrasonic wave sensor. However, when the number of elements included in the channel is increased, drive characteristics for driving the ultrasonic wave sensor are degraded due to the increase in the total electrical capacitance (total electrostatic capacitance) in the entire of the channel.

SUMMARY

An advantage of some aspects of the invention is to provide the ultrasonic wave sensor and an ultrasonic wave device capable of suppressing the degradation of the drive characteristics and achieving the increase in a transmission sound pressure of the ultrasonic wave.

An ultrasonic wave sensor according to an application example includes an oscillating plate including a plurality of oscillators, a wall portion provided on the oscillating plate and surrounding the oscillator, and a piezoelectric element provided on each of the plurality of oscillators. In the oscillating plate, a plurality of piezoelectric elements are electrically connected in plan view as viewed from a thickness direction, and a first area where an input and an output of a drive signal to the piezoelectric element are possible and a second area which is provided on an outer side of the first area and where the piezoelectric element is electrically insulated from the piezoelectric element disposed in the first area are included. In the second area, a distance between the adjacent oscillators is reduced as separated from the first area.

In the application example, the oscillating plate includes the first area and the second area provided on the outer side of the first area. The first area has the piezoelectric element to which the input and the output of the drive signal are possible and the oscillator in which the piezoelectric element is disposed, and each piezoelectric element is electrically connected to each other. On the other hand, the input and the output of the drive signal to the piezoelectric element are not performed in the second area provided on the outer side of the first area.

With such a configuration, the drive signal is input to each piezoelectric element in the first area to drive the piezoelectric elements included in the first area, and thus the oscillators in which the piezoelectric elements are disposed oscillate to transmit the ultrasonic wave. Further, the oscillator in the second area resonates due to the propagation of the mechanical crosstalk to each oscillator disposed in the second area through the oscillating plate. That is, in the application example, when the piezoelectric element in the first area is driven, the oscillators in both the first area and the second area oscillate. Therefore, it is possible to transmit the ultrasonic wave with high sound pressure.

Incidentally, when the oscillator in the first area oscillates, oscillation amplitude of the oscillator in the second area that oscillates due to the mechanical crosstalk increases as close to the first area and decreases as separated from the first area. On the contrary, in the application example, the distance between the oscillators disposed in the second area becomes close as separated from the first area. Therefore, the mechanical crosstalk easily propagates to an end portion of the second area on a side opposite to the first area, and thus it is possible to increase the oscillation amplitude of each oscillator in the second area. Accordingly, it is possible to further increase the sound pressure of the ultrasonic wave transmitted from the ultrasonic wave sensor.

As described above, in the application example, the oscillators in the first area and the second area oscillate by driving the piezoelectric elements disposed in the first area, and thus it is possible to transmit the ultrasonic wave with high sound pressure. Further, since the number of piezoelectric elements (the number of elements) can be reduced as compared with, for example, a case where the piezoelectric elements in the first area and the second area are driven, it is also possible to suppress the degradation of the drive characteristics related to the driving of the ultrasonic wave sensor.

In the ultrasonic wave sensor according to the application example, it is preferable that a plurality of first areas are disposed along the first direction, two second areas arranged in the first direction are disposed between two first areas adjacent in the first direction, and in the two second areas, the distance between the oscillators is reduced as separated from the first area disposed on a plus side of the two first areas in the second area disposed on the plus side in the first direction, and the distance between the oscillators is reduced as separated from the first area disposed on a minus side of the two first areas in the second area disposed on the minus side in the first direction.

In the application example with this configuration, the plurality of first areas are disposed along the first direction, and two second areas are disposed between two first areas adjacent in the first direction. That is, the second area on the plus side that resonates by the driving of the first area disposed on the plus side in the first direction and the second area on the minus side that resonates by the driving of the first area disposed on the minus side in the first direction are provided.

Here, in the second area on the plus side, the distance between the oscillators is reduced as separated from the first area on the plus side. Therefore, similarly to the application example described above, each oscillator disposed in the second area on the plus side easily resonates by the oscillation of the first area on the plus side, and thus it is possible to transmit the ultrasonic wave with high sound pressure. On the other hand, in the second area on the minus side, the distance between the oscillators is increased as separated from the first area on the plus side. Accordingly, it is possible to suppress the resonance of the oscillators in the second area on the minus side by the driving of the first area on the plus side. Similarly, the second area on the minus side easily resonates with the driving of the first area on the minus side and becomes less likely to resonate with the driving of the first area on the plus side.

Accordingly, it is possible to define a range (second area) where the resonance occurs when each first area oscillates and to easily control a transmission position of the ultrasonic wave.

In the ultrasonic wave sensor according to the application example, it is preferable that a distance between the two adjacent second areas is larger than the distance between the oscillators disposed in the second area.

In the application example with this configuration, the distance between the second area on the plus side and the second area on the minus side is larger than the distance between the oscillators. Therefore, it is possible to suppress the propagation of the oscillation from the second area on the plus side to the second area on the minus side. Accordingly, it is possible to further suppress the resonance of the oscillators in the second area on the minus side by the driving of the first area on the plus side.

In the ultrasonic wave sensor according to the application example, it is preferable that the second area is provided surrounding the first area and a distance between the oscillators adjacent in a second direction intersecting the first direction is smaller than the distance between the oscillators adjacent in the first direction in the second area.

In the ultrasonic wave sensor having a one-dimensional array structure in which the plurality of first areas are disposed in the first direction, the plurality of oscillators that easily oscillate are disposed along the first direction. On the contrary, a member having a large thickness such as the wall portion is disposed in the second direction intersecting the first direction to suppress the oscillation of the oscillating plate. Accordingly, the oscillation due to the mechanical crosstalk easily propagates in the first direction, and the oscillation is less likely to propagate in the second direction.

On the contrary, in the application example with the configuration described above, the distance between the oscillators adjacent in the second direction is reduced as compared with the distance between the oscillators adjacent in the first direction in the second area. With such a configuration, the oscillation of the first area easily propagates also in the second direction, and thus it is possible to transmit the ultrasonic wave with high sound pressure from each oscillator disposed in the second area.

An ultrasonic wave device according to an application example includes the ultrasonic wave sensor according to the application example described above and a drive circuit that inputs the drive signal to the piezoelectric element in the first area.

In the application example, as described above, the oscillators in the first area and the second area can oscillate by inputting the drive signal to the piezoelectric element disposed in the first area. Therefore, it is easy for the drive circuit to control the piezoelectric element as compared with a case of controlling all the piezoelectric elements disposed in the first area and the second area.

BRIEF DESCRIPTION OF THE DRAWINGS

The invention will be described with reference to the accompanying drawings, wherein like numbers reference like elements.

FIG. 8 is a comparison diagram of the transmission sound pressure between the comparison examples 1 and 2, the first embodiment, and the second embodiment.

DESCRIPTION OF EXEMPLARY EMBODIMENTS

First Embodiment

Hereinafter, a first embodiment of the invention will be described.

Figure 1:
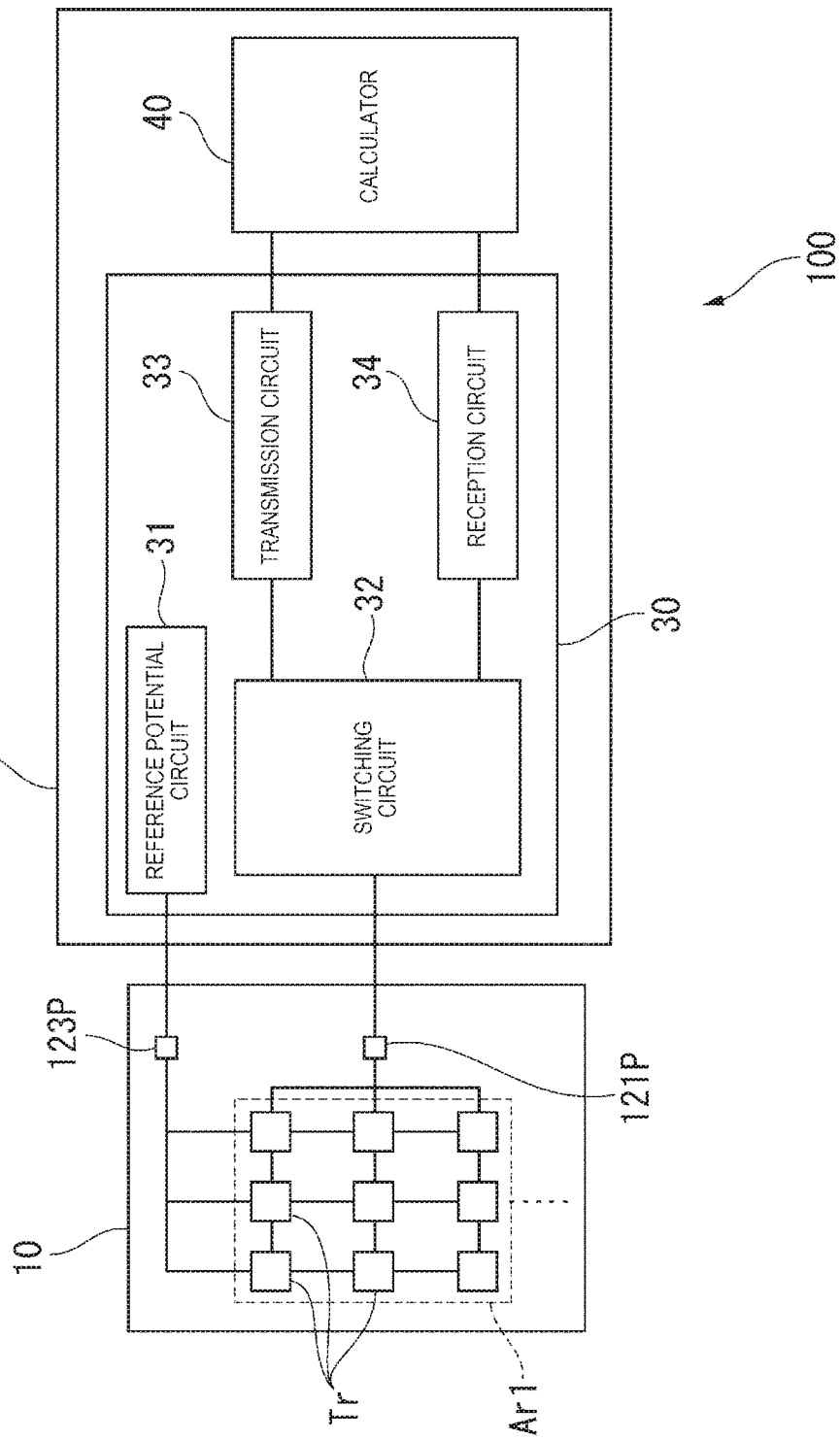
FIG. 1 is a block diagram showing a schematic configuration of a distance measurement device which is an example of an ultrasonic wave device according to a first embodiment.

FIG. 1 is a block diagram showing a schematic configuration of a distance measurement device 100 which is an example of an ultrasonic wave device according to a first embodiment.

As shown in FIG. 1, the distance measurement device 100 according to the embodiment includes an ultrasonic wave sensor 10 and a controller 20 that controls the ultrasonic wave sensor 10. In the distance measurement device 100, the controller 20 controls the ultrasonic wave sensor 10 through a drive circuit 30 and transmits an ultrasonic wave from the ultrasonic wave sensor 10. When the ultrasonic wave is reflected by an object and a reflected wave is received by the ultrasonic wave sensor 10, the controller 20 calculates a distance from the ultrasonic wave sensor 10 to the object based on a time from a transmission timing of the ultrasonic wave to a reception timing of the ultrasonic wave.

Hereinafter, the configuration of such a distance measurement device 100 will be described in detail.
Configuration of Ultrasonic Wave Sensor 10

Figure 2:
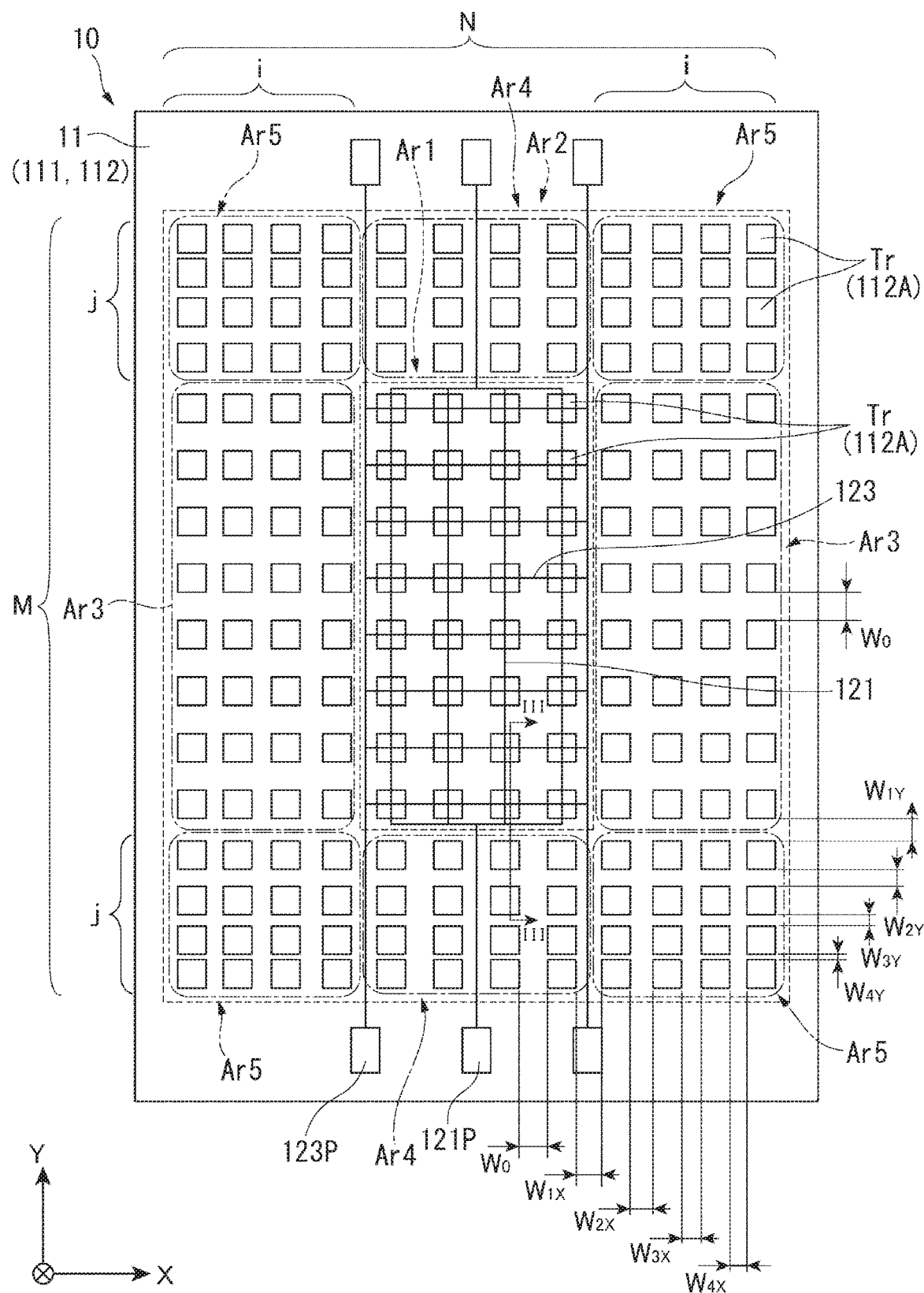
FIG. 2 is a plan view of a schematic configuration of an ultrasonic wave sensor according to the first embodiment.
Figure 3:
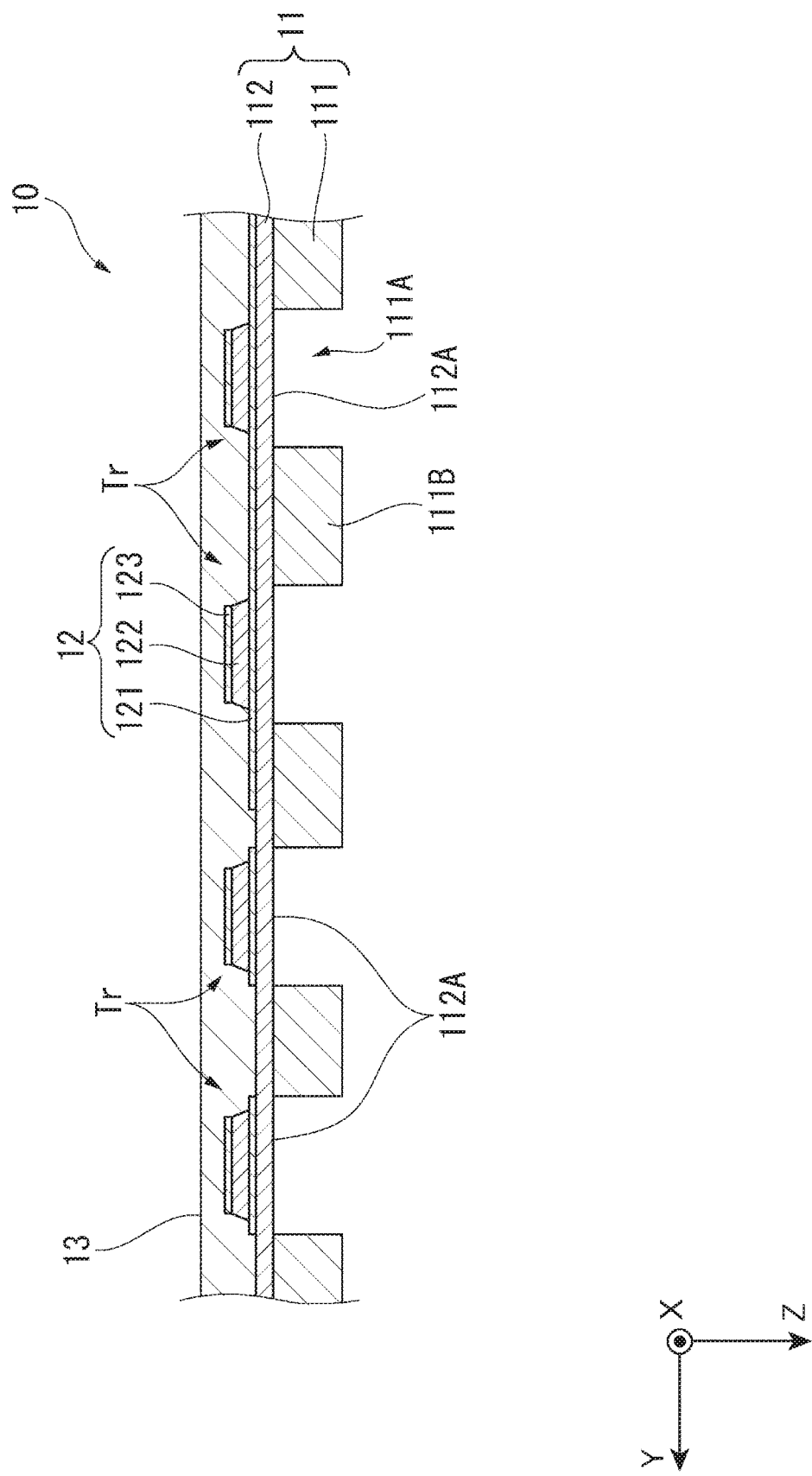
FIG. 3 is a cross-sectional view of the ultrasonic wave sensor taken along line III-III in FIG. 2.

FIG. 2 is a plan view of a schematic configuration of the ultrasonic wave sensor 10. FIG. 3 is a cross-sectional view of the ultrasonic wave sensor 10 taken along line in FIG. 2.

As shown in FIG. 3, the ultrasonic wave sensor 10 is configured by including an element substrate 11, a piezoelectric element 12, and a damper layer 13. Here, in the following description, a substrate thickness direction of the element substrate 11 is set as a Z direction and biaxial directions intersecting (orthogonal to in the embodiment) the Z direction are respectively set as an X direction and a Y direction.
Configuration of Element Substrate 11

As shown in FIG. 3, the element substrate 11 includes a substrate main body portion 111 and an oscillating plate 112 provided on a −Z side of the substrate main body portion 111.

The substrate main body portion 111 is a substrate that supports the oscillating plate 112 and is configured of a semiconductor substrate such as Si. Here, a plurality of opening portions 111A disposed in a two-dimensional array along the X direction and the Y direction are provided in the element substrate 11.

In the embodiment, each opening portion 111A is a through-hole penetrating in the substrate thickness direction (Z direction) of the substrate main body portion 111, and the oscillating plate 112 is provided so as to block one end side (−Z side) of the through-hole. That is, a portion of the substrate main body portion 111 where the opening portion 111A is not provided configures a wall portion 111B, and the oscillating plate 112 is laminated on this wall portion 111B.

The oscillating plate 112 is configured of, for example, $SiO_2$, a laminate of $SiO_2$ and $ZrO_2$, or the like, and is provided on the −Z side of the substrate main body portion 111. A thickness dimension of the oscillating plate 112 is sufficiently smaller than the substrate main body portion 111. This oscillating plate 112 is supported by the wall portion 111B of the substrate main body portion 111 configuring the opening portion 111A and blocks the −Z side of the opening portion 111A. A portion of the oscillating plate 112 overlapping with the opening portion 111A in plan view (portion blocking the opening portion 111A) configures an oscillator 112A. That is, the oscillator 112A of the oscillating plate 112 is surrounded by the wall portion 111B, and the outer edge of the oscillator 112A is defined by the opening portion 111A. This oscillator 112A is an oscillation area where the oscillation by the piezoelectric element 12 is possible.

Configuration of Piezoelectric Element 12

Each piezoelectric element 12 is provided on one surface of the oscillating plate 112 (−Z side surface) and at a position overlapping with each oscillator 112A in plan view as viewed from the Z direction. As shown in FIG. 3, this piezoelectric element 12 is configured of sequentially laminating a lower electrode 121, a piezoelectric layer 122, and an upper electrode 123 on the oscillating plate 112.

Here, one ultrasonic wave transducer Tr is configured of one oscillator 112A on the oscillating plate 112 and the piezoelectric element 12 provided on the oscillator 112A. Therefore, a plurality of the ultrasonic wave transducers Tr are disposed along the X direction and the Y direction in the ultrasonic wave sensor 10 as shown in FIG. 2.

In the ultrasonic wave transducer Tr having such a configuration, when a voltage is applied between the lower electrode 121 and the upper electrode 123, the piezoelectric layer 122 is expanded and contracted, and the oscillator 112A of the oscillating plate 112 provided with the piezoelectric element 12 oscillates at a frequency corresponding to an opening width or the like of the opening portion 111A. Accordingly, the ultrasonic wave is transmitted from a +Z side of the oscillator 112A (opening portion 111A side).

Further, when the ultrasonic wave is input to the opening portion 111A, the oscillator 112A oscillates due to the ultrasonic wave and a potential difference is generated between the upper and lower sides of the piezoelectric layer 122. Therefore, it is possible to detect (receive) the ultrasonic wave by detecting the potential difference generating between the lower electrode 121 and the upper electrode 123.

Configuration of Damper Layer 13

As shown in FIG. 3, the damper layer 13 is provided on the −Z side of the oscillating plate 112.

In the embodiment, the damper layer 13 covers the entire oscillating plate 112 and −Z side of each piezoelectric element 12 (that is, a surface on a side opposite to a side where ultrasonic wave is transmitted and received). In the damper layer 13, a portion overlapping with the piezoelectric element 12 is in close contact with a surface of the piezoelectric element 12, and a portion not overlapping with the piezoelectric element 12 is in close contact with the surface of −Z side of the oscillating plate 112, as viewed from the Z direction.

This damper layer 13 is configured of a material, for example, having Young's modulus of 130 MPa or less (for example, silicon or the like).

Disposition of Ultrasonic Wave Transducer Tr in Ultrasonic Wave Sensor 10

In the ultrasonic wave sensor 10 according to the embodiment, the ultrasonic wave transducers Tr configured of the oscillators 112A and the piezoelectric elements 12 are disposed in a two-dimensional array structure on an XY plane as shown in FIG. 2.

Here, it is assumed that the ultrasonic wave transducers Tr having N columns along the X direction and M rows along the Y direction are disposed, and an ultrasonic wave transducer Tr located at x column y row is indicated by (x,y).

In the embodiment, the oscillating plate 112 is configured by including a first area Ar1 including the ultrasonic wave transducers Tr of (X,Y)=(i+1,j+1) to (N−i,M−j) and a second area Ar2 disposed on an outer side of the first area Ar1.

First Area Ar1

In each ultrasonic wave transducer Tr disposed in the first area Ar1, the lower electrode 121 is connected to each other. For example, the lower electrode 121 is linearly formed straddling a column of the ultrasonic wave transducers Tr arranged in the Y direction in the first area Ar1 as shown in FIG. 2. Further, a plurality of the lower electrodes 121 arranged in the X direction in the first area Ar1 are connected to each other and are connected to, for example, drive terminals 121P provided on a peripheral portion of the oscillating plate 112. The drive terminals 121P are electrically connected to the drive circuit 30 of the controller 20. Accordingly, when a drive signal is input from the drive circuit 30 to the drive terminals 121P, the drive signal is input to the lower electrodes 121 of all the ultrasonic wave transducers Tr in the first area Ar1.

Similarly, the upper electrode 123 is linearly formed straddling a row of the ultrasonic wave transducers Tr arranged in the X direction in the first area Ar1, and a plurality of the upper electrodes 123 arranged in the X direction in the first area Ar1 are connected to each other and are connected to common terminals 123P. The common terminals 123P are electrically connected to the drive circuit 30 of the controller 20. Accordingly, a predetermined common potential (for example, −3 V) is applied from the drive circuit 30 to each upper electrode 123.

That is, in the embodiment, each ultrasonic wave transducer Tr disposed in the first area Ar1 is electrically connected in parallel.

Here, the upper electrodes 123 are connected to be common in all the ultrasonic wave transducers Tr in the first area Ar1, but the invention is not limited thereto. For example, the upper electrodes 123 to which the common potential is applied may be common to each ultrasonic wave transducer Tr disposed in the ultrasonic wave sensor 10. That is, the upper electrodes 123 may be common to the ultrasonic wave transducers Tr in the first area Ar1 and the ultrasonic wave transducers Tr in the second area Ar2, and the common potential may be applied to the upper electrodes 123.

When the ultrasonic wave is transmitted from the ultrasonic wave sensor 10, the common potential (for example, −3 V or the like) is applied to the upper electrodes 123 and the drive signal is input to the lower electrodes 121. Accordingly, each ultrasonic wave transducer Tr in the first area Ar1 is driven and the oscillators 112A in the first area Ar1 oscillate to transmit the ultrasonic wave.

Further, an interval (element pitch) between the ultrasonic wave transducers Tr (oscillator 112A) adjacent in the X direction is the same dimension ($W_0$) in the first area Ar1. Similarly, an interval (element pitch) between the ultrasonic wave transducers Tr (oscillator 112A) adjacent in the Y direction is the same dimension ($W_0$) in the first area Ar1. In the embodiment, for simplicity of description, the element pitch in the X direction and the element pitch in the Y direction are the same dimension ($W_0$). However, the element pitch may be different between the X direction and the Y direction.

Second Area Ar2

The second area Ar2 is disposed on the outer side of the first area Ar1.

Each ultrasonic wave transducer Tr in the second area Ar2 is electrically insulated from each ultrasonic wave transducer Tr in the first area Ar1. That is, since the lower electrode 121 of each ultrasonic wave transducer Tr in the second area Ar2 is not connected (insulated) to the lower electrode 121 of the first area Ar1, the drive signal is not input to the lower electrode 121 of each ultrasonic wave transducer Tr in the second area Ar2.

Further, since the upper electrode 123 of each ultrasonic wave transducer Tr in the second area Ar2 is not connected to the upper electrode 123 of the first area Ar1, the common potential is not applied to the upper electrode 123 of each ultrasonic wave transducer Tr in the second area Ar2. The upper electrode 123 of each ultrasonic wave transducer Tr in the second area Ar2 may be connected to the upper electrode 123 of the first area Ar1, and thus the common potential may be applied to the upper electrode 123 of each ultrasonic wave transducer Tr in the second area Ar2.

In the embodiment, when each ultrasonic wave transducer Tr in the first area Ar1 is driven at the time of the transmission of the ultrasonic wave, an oscillation generated in each oscillator 112A in the first area Ar1 propagates to the second area Ar2 through the oscillating plate 112 (mechanical crosstalk). The oscillator 112A in the second area Ar2 resonates due to the influence of this mechanical crosstalk, and the ultrasonic wave is transmitted from each ultrasonic wave transducer Tr in the second area Ar2.

Here, each ultrasonic wave transducer Tr in the second area Ar2 is configured by disposing the piezoelectric element 12 on the oscillator 112A similarly to each ultrasonic wave transducer Tr in the first area Ar1. Accordingly, mechanical characteristics (natural frequency) of the ultrasonic wave transducer Tr can be made the same in the first area Ar1 and the second area Ar2. Therefore, when each oscillator 112A in the second area Ar2 resonates, each oscillator 112A in the second area Ar2 oscillates at the same frequency as each oscillator 112A in the first area Ar1 and the ultrasonic waves having the same frequency are transmitted from the first area Ar1 and the second area Ar2.

The second area Ar2 includes an X side area Ar3, a Y side area Ar4, and a corner portion area Ar1 as shown in FIG. 2.

The X side areas Ar3 are areas provided on ±X sides of the first area Ar1 and include the ultrasonic wave transducers Tr (oscillators 112A) of (X,Y)=(1,j+1) to (i,M−j) and (X,Y)=(N−i+1,j+1) to (N,M−j).

In the X side areas Ar3, the element pitch along the X direction is reduced as separated from the first area Ar1.

For example, N=12, M=16, i=j=4 in the example shown in FIG. 2. Here, the element pitch between X=i (=4) and X=i+1 (=5) and the element pitch between X=N−i (=8) and X=N−i+1 (=9) are set to $W_{1X}$. The element pitch between X=i−1 (=3) and X=i (=4) and the element pitch between X=N−i+1 (=9) and X=N−i+2 (=10) are set to $W_{2X}$. The element pitch between X=i−2 (=2) and X=i−1 (=3) and the element pitch between X=N−i+2 (=10) and X=N−i+3 (=11) are set to $W_{3X}$. The element pitch between X=i−3 (=1) and X=i−2 (=2) and the element pitch between X=N−i+3 (=11) and X=N−i+3 (=12) are set to $W_{4X}$. In this case, the element pitch along the X direction is $W_{1X} \geq W_{2X} \geq W_{3X} \geq W_{4X}$ and $W_{1X} > W_{4X}$.

In FIG. 2, $W_{1X} > W_{2X} > W_{3X} > W_{4X}$. However, the element pitch is not necessarily to be gradually reduced as separated from the first area Ar1. For example, some element pitches may be the same as $W_{1X} = W_{2X}$, $W_{2X} > W_{3X}$, $W_{3X} = W_{4X}$, or the like.

The Y side areas Ar4 are areas provided on ±Y sides of the first area Ar1 and include the ultrasonic wave transducers Tr (oscillators 112A) of (X,Y)=(i+1,1) to (N−i,j) and (X,Y)=(i+1,M−j+1) to (N−i,M).

In the Y side areas Ar4, the element pitch along the Y direction is reduced as separated from the first area Ar1.

For example, the element pitch between Y=j (=4) and Y=j+1 (=5) and the element pitch between Y=M−j (=12) and Y=M−j+1 (=13) are set to $W_{1Y}$ in the example shown in FIG. 2. The element pitch between Y=j−1 (=3) and Y=j (=4) and the element pitch between Y=M−j+1 (=13) and Y=M−j+2 (=14) are set to $W_{2Y}$. The element pitch between Y=j−2 (=2) and Y=j−1 (=3) and the element pitch between Y=M−j+2 (=14) and Y=M−j+3 (=15) are set to Way. The element pitch between Y=j−3 (=1) and Y=j−2 (=2) and the element pitch between Y=M−j+3 (=15) and Y=M−j+3 (=16) are set to $W_{4Y}$. In this case, the element pitch along the Y direction is $W_{1Y} \geq W_{2Y} \geq W_{3Y} \geq W_{4Y}$ and $W_{1Y} > W_{4Y}$.

In FIG. 2, $W_{1Y} > W_{2Y} > W_{3Y} > W_{4Y}$. However, the element pitch is not necessarily to be gradually reduced as separated from the first area Ar1. For example, some element pitches may be the same as $W_{1Y} = W_{2Y}$, $W_{2Y} > W_{3Y}$, $W_{3Y} = W_{4y}$, or the like.

The corner portion areas Ar5 are provided between the X side area Ar3 and the Y side area Ar4 and include the ultrasonic wave transducers Tr (oscillators 112A) of (X,Y)=(1,1) to (i,j), (X,Y)=(N−i+1,1) to (N,j), (X,Y)=(1,M−j+1) to (i,M), and (X,Y)=(N−i+1,M−j+1) to (N,M).

In the corner portion areas Ar5, the element pitches in both the X direction and the Y direction are reduced as separated from the first area Ar1. That is, $W_{1X} \geq W_{2X} \geq W_{3X} \geq W_{4X}$, $W_{1Y} \geq W_{2Y} \geq W_{3Y} \geq W_{4Y}$, $W_{1X} > W_{4X}$, and $W_{1Y} > W_{4Y}$.

As described above, the oscillation of the mechanical crosstalk generated when each ultrasonic wave transducer Tr in the first area Ar1 is driven propagates at the time of the transmission of the ultrasonic wave to resonate each oscillator 112A in the second area Ar2. At the time, the oscillation propagated from the first area Ar1 is largely attenuated as separated from the first area Ar1 or as the element pitch increases.

In the embodiment, the element pitch is reduced as separated from the first area Ar1. Therefore, it is possible to transmit the oscillation propagated from the first area Ar1 to each oscillator 112A in the second area Ar2 while suppressing the attenuation of the oscillation.

Further, in a case where each element pitch of the second area Ar2 is set to the minimum element pitch ($W_{4X}$ and $W_{4Y}$), amplitude of the oscillation of the oscillator 112A of the second area Ar2 on the first area Ar1 side is larger than the oscillation of the oscillator 112A disposed at a position separated from the first area Ar1. In this case, the sound pressure of the transmitted ultrasonic wave becomes non-uniform. On the contrary, when the element pitch is gradually reduced as separated from the first area Ar1 as described above, it is possible to reduce the difference in the amplitude when each oscillator 112A resonates and to transmit a uniform ultrasonic wave.

Configuration of Controller 20

The controller 20 is configured by including the drive circuit 30 that drives the ultrasonic wave sensor 10 and a calculator 40. Further, the controller 20 may additionally include a storage that stores various data, various programs, and the like for controlling the distance measurement device 100.

The drive circuit 30 is a driver circuit for controlling the driving of the ultrasonic wave sensor 10 and includes, for example, a reference potential circuit 31, a switching circuit 32, a transmission circuit 33, a reception circuit 34, and the like as shown in FIG. 1.

The reference potential circuit 31 is connected to the upper electrodes 123 of the ultrasonic wave sensor 10 and applies reference potential (for example, −3 V or the like) to the upper electrodes 123.

The switching circuit 32 is connected to the lower electrode 121 of each ultrasonic wave transducer Tr disposed in the first area Ar1, the transmission circuit 33, and the reception circuit 34. This switching circuit 32 is configured of a switching circuit, and switches between a transmission connection that connects the drive terminals 121P and the transmission circuit 33 and a reception connection that connects the drive terminals 121P and the reception circuit 34.

The transmission circuit, 33 is connected to the switching circuit 32 and the calculator 40. When the switching circuit 32 is switched to the transmission connection, the transmission circuit 33 outputs the drive signal of a pulse waveform to each ultrasonic wave transducer Tr in the first area Ar1 based on the control of the calculator 40 to transmit the ultrasonic wave from the ultrasonic wave sensor 10.

Incidentally, in a case where the drive signal is input from the transmission circuit 33 to the plurality of ultrasonic wave transducers Tr, drive characteristics (driving characteristics) vary depending on the number of ultrasonic wave transducers Tr connected to the transmission circuit 33. That is, when it is assumed that a voltage of the drive signal that can be output from the transmission circuit 33 (voltage width from upper limit value to lower limit value) is Vp, the total electrostatic capacitance of the ultrasonic wave transducers Tr connected to the transmission circuit 33 is C, and a drive frequency of the drive signal is f, an effective current value I required for the transmission circuit 33 is represented by $I = \Pi \cdot f \cdot C \cdot Vp/\sqrt{2}$.

Here, since the total electrostatic capacitance C also increases in a case where the number of ultrasonic wave transducers Tr connected to the transmission circuit 33 is large, it is necessary to increase a current capacity required for the transmission circuit 33 by that amount. Therefore, an expensive transmission circuit 33 having high current capacity is required depending on the number of ultrasonic wave transducers Tr connected in parallel. In other words, a case where the current capacity of the transmission circuit 33 is low with respect to the total electrostatic capacitance C of the ultrasonic wave transducers Tr connected to the transmission circuit 33 means that the drive characteristics of each ultrasonic wave transducer Tr are degraded.

On the contrary, in the embodiment, only the ultrasonic wave transducers Tr in the first area Ar1 of the ultrasonic wave sensor 10 are connected to the drive circuit 30, and the ultrasonic wave transducers Tr in the second area Ar2 are not connected to the drive circuit 30 as described above. That is, it is possible to suppress the number of ultrasonic wave transducers Tr connected to the transmission circuit 33 and to drive each ultrasonic wave transducer Tr with high driving characteristics.

The reception circuit 34 is connected to the switching circuit 32 and the calculator 40 and receives a reception signal from each lower electrode 121 when the switching circuit 32 is switched to the reception connection. This reception circuit 34 is configured by including, for example, a linear noise amplifier, an A/D converter, and the like. The reception circuit 34 implements each of signal processing such as conversion of the input reception signal into a digital signal, removing of a noise component, and amplification to a desired signal level, and then outputs the reception signal after the processing to the calculator 40.

The calculator 40 is configured of, for example, a central processing unit (CPU) and the like and controls the ultrasonic wave sensor 10 through the drive circuit 30 to cause the ultrasonic wave sensor 10 to implement a transmission and reception process of the ultrasonic wave.

That is, the calculator 40 switches the switching circuit 32 to the transmission connection and drives the ultrasonic wave sensor 10 from the transmission circuit 33 to implement the transmission process of the ultrasonic wave. Further, the calculator 40 switches the switching circuit 32 to the reception connection immediately after the transmission of the ultrasonic wave to cause the ultrasonic wave sensor 10 to receive the reflected wave reflected by the object. The calculator 40 calculates the distance from the ultrasonic wave sensor 10 to the object by a time-of-flight (ToF) method using, for example, the time from the transmission timing when the ultrasonic wave is transmitted from the ultrasonic wave sensor 10 to reception of the reception signal and sound velocity in the air.

Sound Pressure Comparison

Next, the sound pressure of the ultrasonic wave when the ultrasonic wave sensor 10 according to the embodiment transmits the ultrasonic wave will be described.

Figure 4:
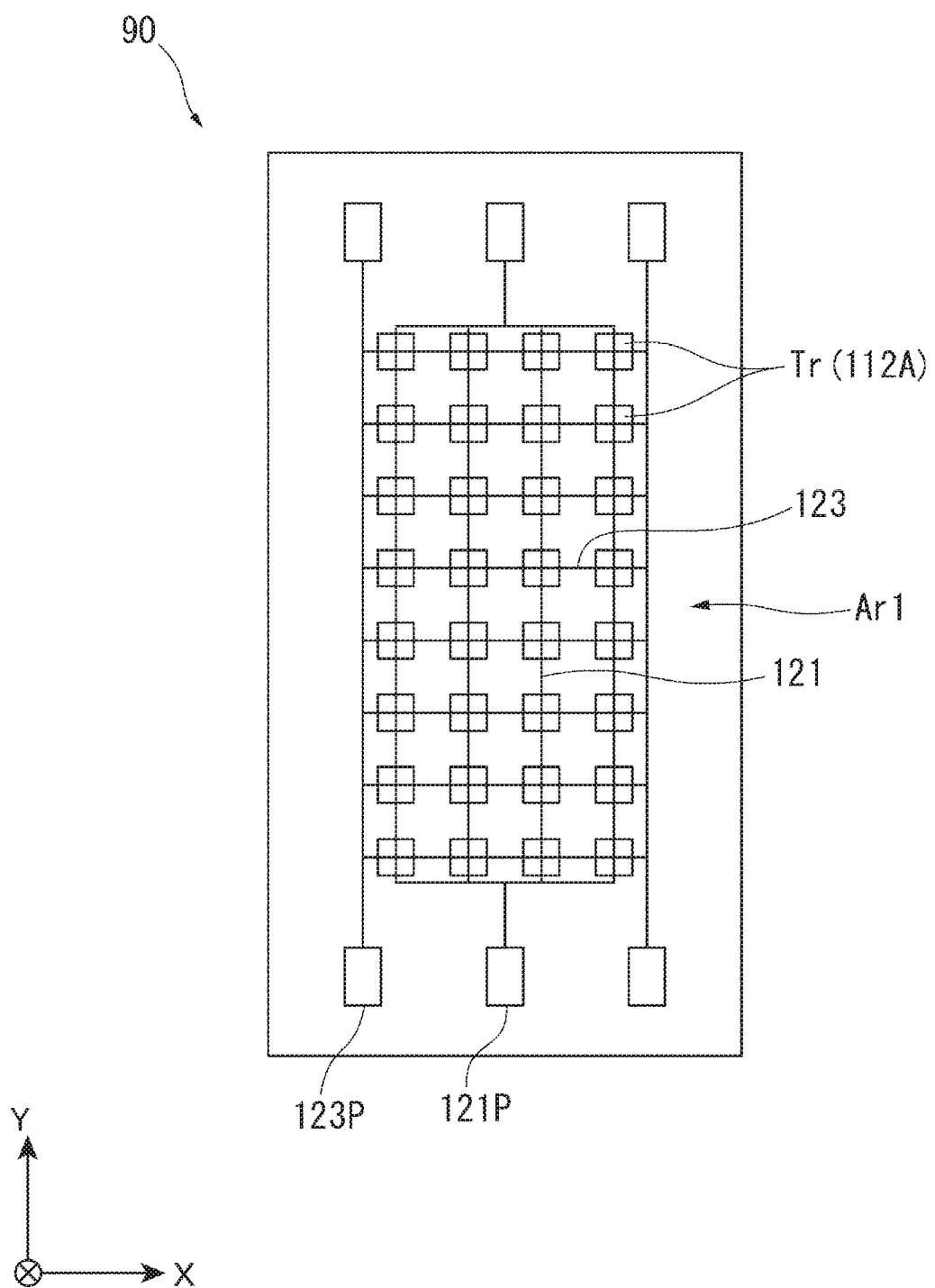
FIG. 4 is a plan view of a schematic configuration of an ultrasonic wave sensor according to a comparison example 1.

FIG. 4 is a plan view of an example of an ultrasonic wave sensor 90 according to a comparison example 1. The ultrasonic wave sensor 90 as shown in FIG. 4 is configured of only the first area Ar1 of the ultrasonic wave sensor 10.

The following table 1 indicates the number of drive elements, the number of non-drive elements, the number of oscillation elements, and a standardized transmission sound pressure in the ultrasonic wave sensor 90 according to the comparison example 1 and the ultrasonic wave sensor 10 according to the embodiment.

TABLE 1

|  | Number of drive elements | Number of non-drive elements | Number of oscillation elements | Standardized transmission sound pressure |
|---|---|---|---|---|
| Comparison example 1 (ultrasonic wave sensor 90) | 32 | 0 | 32 | 100% |
| First embodiment (ultrasonic wave sensor 10) | 32 | 160 | 192 | 240% |

Here, the number of drive elements is the number of ultrasonic wave transducers Tr driven by the input of the drive signal. The number of non-drive elements is the number of ultrasonic wave transducers Tr disposed in the second area Ar2 where the drive signal is not input. The number of oscillation elements is the number of ultrasonic wave transducers Tr actually oscillating when the drive signal is input. The standardized transmission sound pressure indicates a magnitude of the sound pressure when the sound pressure of the ultrasonic wave transmitted from the ultrasonic wave sensor 90 according to the comparison example 1 is taken as 100%.

Figure 5:
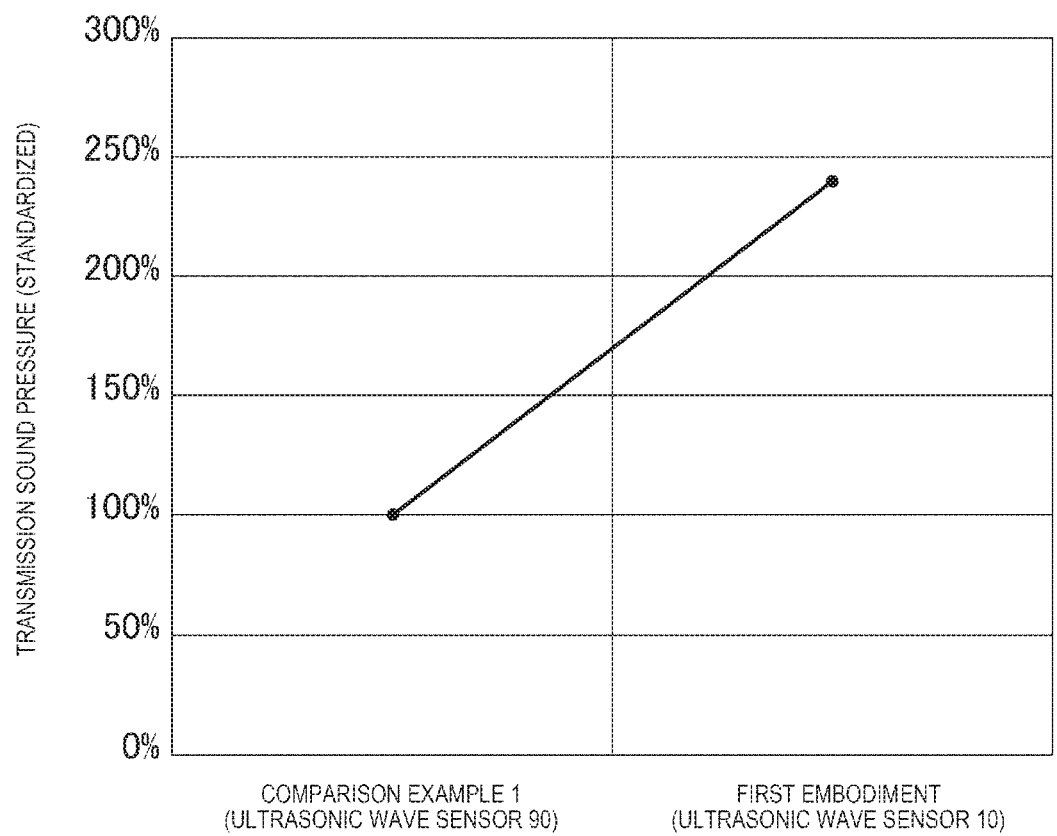
FIG. 5 is a comparison diagram of a transmission sound pressure between the comparison example 1 and the first embodiment.

FIG. 5 is a graph representing a difference in the transmission sound pressure in the comparison example 1 and the embodiment.

The ultrasonic wave sensor 90 according to the comparison example 1 and the ultrasonic wave sensor 10 according to the embodiment have the same number of drive elements. Therefore, in the ultrasonic wave sensor 90 according to the comparison example 1 and the ultrasonic wave sensor 10 according to the embodiment, the total electrostatic capacitance C is the same value and the drive characteristics when the drive circuit 30 drives each ultrasonic wave transducer Tr are the same.

However, as shown in table 1 and FIG. 5, when the drive signal is input to the same number of ultrasonic wave transducers Tr, the ultrasonic wave having the sound pressure of 2.40 times can be obtained in the ultrasonic wave sensor 10 according to the embodiment as compared with the ultrasonic wave sensor 90 according to the comparison example 1.

Action Effect of Embodiment

In the ultrasonic wave sensor 10 according to the embodiment, the piezoelectric element 12 is provided on each oscillator 112A of the oscillating plate 112 provided with the plurality of oscillators 112A to dispose the ultrasonic wave transducers Tr in a two-dimensional array. This oscillating plate 112 includes the first area Ar1 and the second area Ar2 provided on the outer side of the first area Ar1. In the first area Ar1, the ultrasonic wave transducers Tr to which the input and the output of the drive signal are possible are provided and the ultrasonic wave transducers Tr are electrically connected to each other. On the other hand, in the second area Ar2, each ultrasonic wave transducer Tr is electrically insulated from the ultrasonic wave transducers Tr in the first area Ar1. That is, even in a case where the drive signal is input to the ultrasonic wave transducers Tr in the first area Ar1, the drive signal is not input to each ultrasonic wave transducer Tr in the second area Ar2.

In such an ultrasonic wave sensor 10, the drive signal is input to each ultrasonic wave transducer Tr in the first area Ar1 to drive the piezoelectric element 12 of each ultrasonic wave transducer Tr in the first area Ar1 and to transmit the ultrasonic wave from the first area Ar1. Further, the oscillator 112A in the second area Ar2 resonates due to the propagation of the mechanical crosstalk to each oscillator 112A disposed in the second area Ar2 through the oscillating plate 112. Accordingly, when the ultrasonic wave transducers Tr in the first area Ar1 are driven, the oscillators 112A of both the first area Ar1 and the second area Ar2 oscillate. Therefore, it is possible to transmit the ultrasonic wave with high sound pressure.

At this time, in the embodiment, a distance (element pitch) between the oscillators 112A disposed in the second area Ar2 is reduced as separated from the first area Ar1. Therefore, since the mechanical crosstalk is easily propagated to an end portion on a side of the second area Ar2 opposite to the first area Ar1, it is possible to increase the oscillation amplitude of each oscillator 112A in the second area Ar2. Accordingly, it is possible to further increase the sound pressure of the ultrasonic wave transmitted from the ultrasonic wave sensor 10.

Further, the distance measurement device 100 according to the embodiment includes the drive circuit 30 that controls the driving of the ultrasonic wave sensor 10 as described above. As described above, the ultrasonic wave transducers Tr in the second area Ar2 resonate by driving only the ultrasonic wave transducers Tr disposed in the first area Ar1 in order to increase the sound pressure of the ultrasonic wave. That is, it is possible to reduce the number of ultrasonic wave transducers Tr to be driven in the embodiment as compared with a case where all the ultrasonic wave transducers Tr disposed in the first area Ar1 and the second area Ar2 are driven to increase the transmission sound pressure of the ultrasonic wave. Therefore, it is possible to decrease the total electrostatic capacitance of the ultrasonic wave transducers Tr to be driven by the drive circuit 30 and to improve the drive characteristics of the ultrasonic wave sensor 10.

Second Embodiment

Hereinafter, a second embodiment of the invention will be described.

Figure 6:
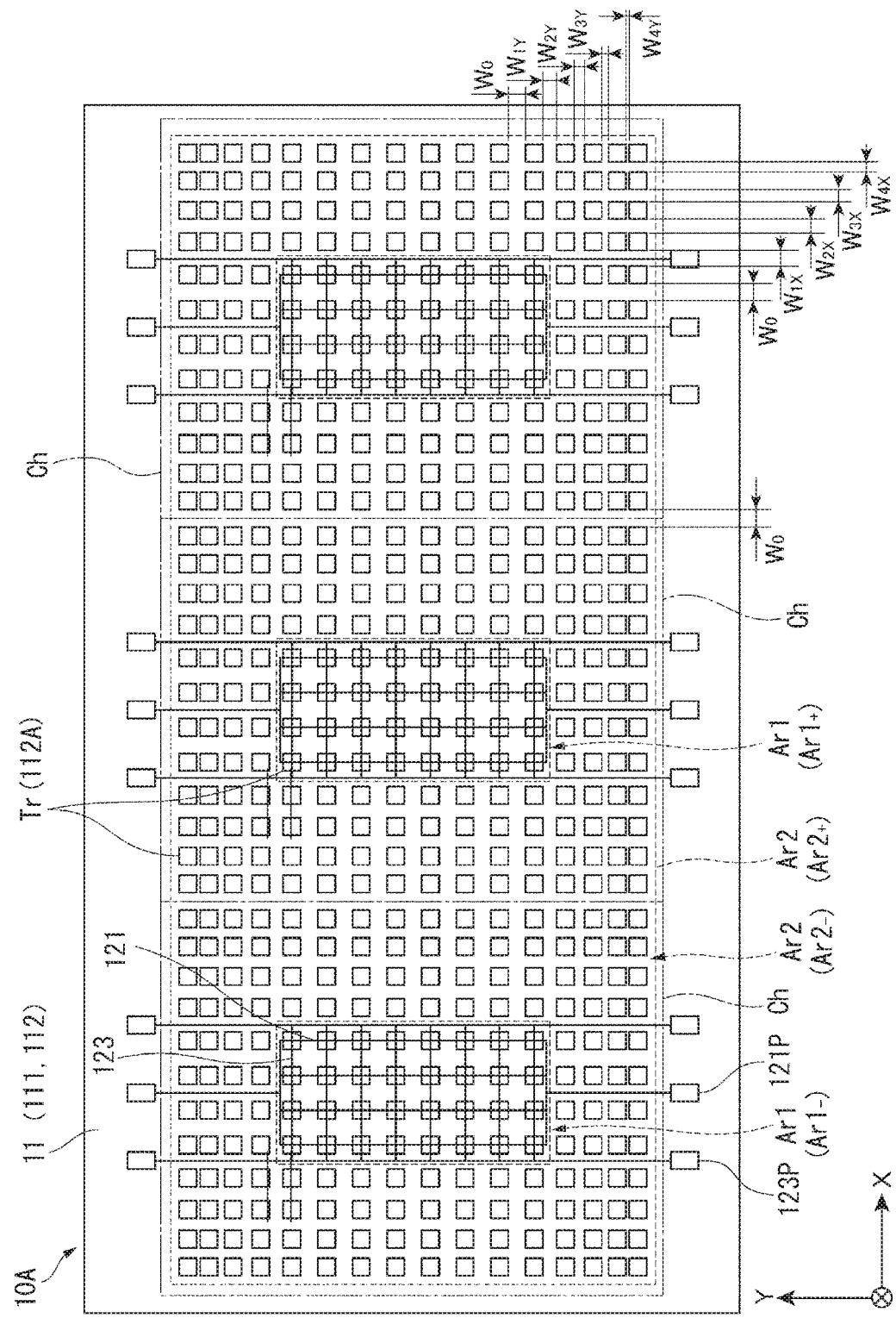
FIG. 6 is a plan view of a configuration of an ultrasonic wave sensor according to a second embodiment.

FIG. 6 is a schematic view of a schematic configuration of an ultrasonic wave sensor 10A according to the second embodiment.

As shown in FIG. 6, the ultrasonic wave sensor 10A according to the second embodiment has a configuration in which a plurality of transmitter-receivers Ch are disposed side by side in the X direction (first direction) when the ultrasonic wave sensor 10 including the first area Ar1 and the second area Ar2 as described in the first embodiment is taken as one transmitter-receiver Ch.

In other words, two second areas Ar2 arranged in the X direction are disposed between two first areas Ar1 adjacent in the X direction among the first areas Ar1 adjacent in the X direction. In these two second areas Ar2, the element pitch of a second area $Ar2_+$ disposed on a plus side (+X side) in the X direction is reduced as separated from a first area $Ar1_+$ disposed on the +X side. Further, the element pitch of a second area $Ar2_-$ disposed on a minus side (−X side) in the X direction is reduced as separated from a first area $Ar1_-$ disposed on the −X side.

Incidentally, in the embodiment, the plurality of transmitter-receivers Ch are disposed side by side in the X direction. In a case where another transmitter-receiver Ch is provided adjacent to the transmitter-receiver Ch in this manner, the mechanical crosstalk when the transmitter-receiver Ch oscillates increases as compared with a case where a substrate peripheral portion having continuous wall portions 111B is provided adjacent to the transmitter-receiver Ch.

That is, a periphery of the second area Ar2 configures a peripheral frame of the element substrate 11 surrounded by the wall portions 111B in the ultrasonic wave sensor 10 configured of the single transmitter-receiver Ch as in the first embodiment. In this case, the oscillation of the second area Ar2 is suppressed by the peripheral frame. On the contrary, other transmitter-receivers Ch where the opening portions 111A are formed in an array in the X direction are provided in the embodiment. Therefore, it is easy for the oscillation to propagate in the X direction as compared with the Y direction (second direction).

Therefore, in the embodiment, the element pitches in the second area Ar2 are formed so as to be $W_{1X} > W_{1Y}$, $W_{2X} > W_{2Y}$, $W_{3X} > W_{3Y}$, and $W_{4X} > W_{4Y}$ as shown in FIG. 6.

Further, an interval larger than each element pitch in the second area Ar2 is formed between the adjacent transmitter-receivers Ch, that is, between the second areas Ar2_ on the −X side and the second area Ar2_+ on the +X side adjacent in the X direction. For example, in the embodiment, the dimension between the second area Ar2_ and the second area Ar2_+ is the same as the element pitch (=$W_0$) in the first area. Here, the dimension between the second area Ar2_ and the second area Ar2_+ is $W_0$, but may be larger than $W_0$.

With such a configuration, for example, when the first area Ar1_+ on the +X side is driven, the oscillation propagation to the first area Ar1_ on the −X side and the second area Ar2_ surrounding the first area Ar1_ is suppressed. Accordingly, it is possible to suppress the trouble that other transmitter-receivers Ch are driven in a case where each transmitter-receiver Ch is respectively driven independently and to transmit the ultrasonic wave to a desired position.

Sound Pressure Comparison

Next, the sound pressure of the ultrasonic wave when the ultrasonic wave sensor 10A according to the second embodiment transmits the ultrasonic wave will be described.

Figure 7:
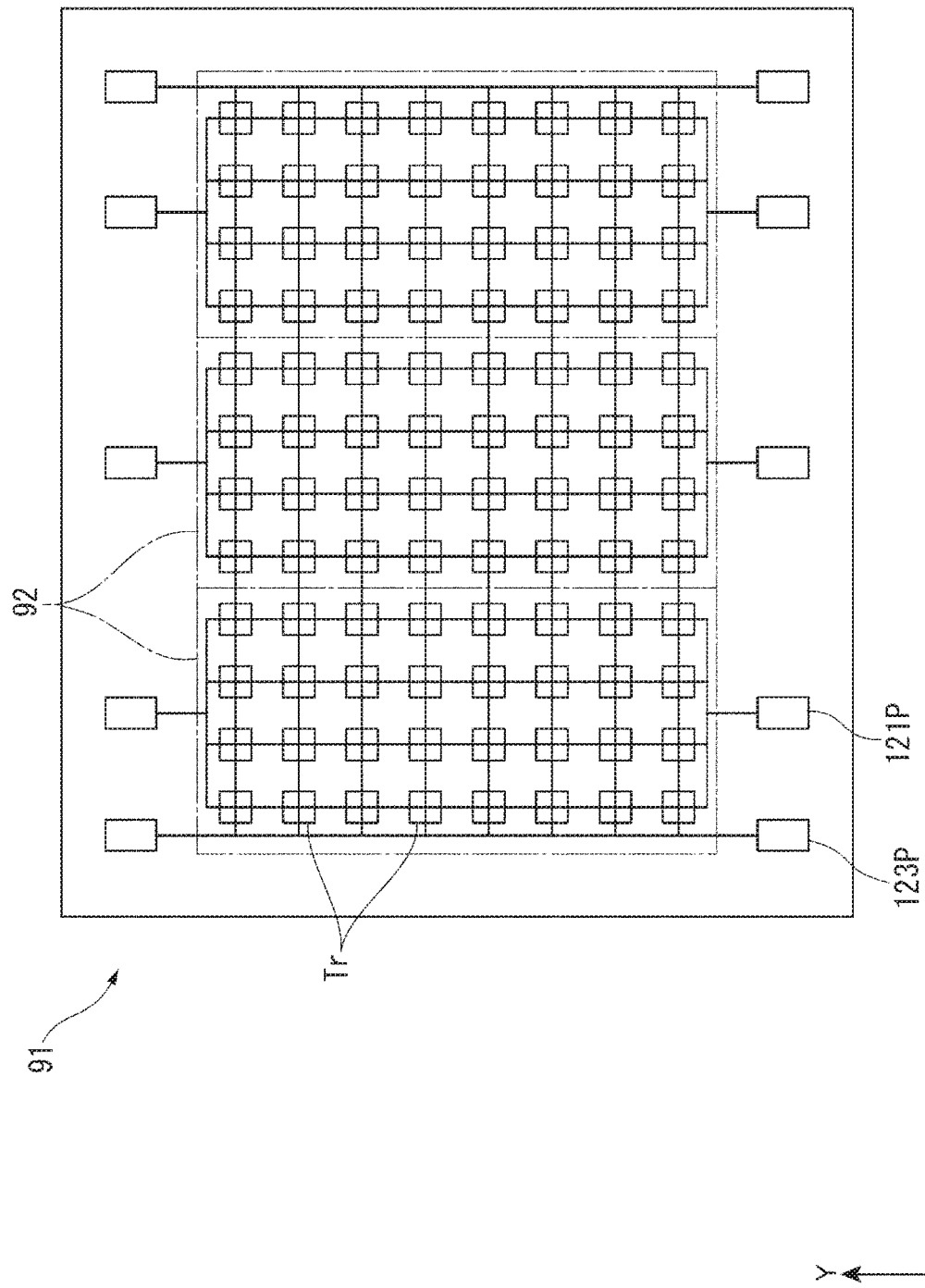
FIG. 7 is a plan view of a schematic configuration of an ultrasonic wave sensor according to a comparison example 2.

FIG. 7 is a plan view of an example of an ultrasonic wave sensor 91 according to a comparison example 2. In the ultrasonic wave sensor 91 shown in FIG. 7, a plurality of transmitter-receivers 92 configured of only the first area Ar1 of the embodiment are arranged in the X direction.

The following table 2 indicates the number of drive elements, the number of non-drive elements, the number of oscillation elements, the standardized transmission sound pressure, and a standardized capacitance in the ultrasonic wave sensor 90 according to the comparison example 1, the ultrasonic wave sensor 91 according to the comparison example 2, and the ultrasonic wave sensor 10A according to the first embodiment.

TABLE 2

| | CH | Number of drive elements | Number of non-drive elements | Number of oscillation elements | Standardized transmission sound pressure | Standardized capacitance |
|---|---|---|---|---|---|---|
| Comparison example 1 (ultrasonic wave sensor 90) | 1 | 32 | 0 | 32 | 100% | 33% |
| Comparison example 2 (ultrasonic wave sensor 91) | 3 | 96 | 0 | 96 | 156% | 100% |
| First embodiment (ultrasonic wave sensor 10) | 1 | 32 | 160 | 192 | 240% | 33% |
| Second embodiment (ultrasonic wave sensor 10A) | 3 | 96 | 480 | 576 | 577% | 100% |

Here, CH indicates the number of transmitter-receivers Ch. The standardized capacitance is capacitance obtained by standardizing the total electrostatic capacitance C of all the ultrasonic wave transducers Tr to which the input of the drive signal is possible with the ultrasonic wave sensor 10A according to the comparison example 2 as reference.

FIG. 8 is a graph representing the transmission sound pressure and the total electrostatic capacitance in the comparison examples 1 and 2, the first embodiment and the second embodiment.

In the comparison example 2, the total electrostatic capacitance C increases as compared with the comparison example 1 due to the increase in the number of elements, but the sound pressure of the ultrasonic wave transmittable from the ultrasonic wave sensor 91 also increases by that amount of 1.56 times. However, in the ultrasonic wave sensor 10 according to the first embodiment and the ultrasonic wave sensor 10A according to the second embodiment, it is possible to transmit the ultrasonic wave with high sound pressure as compared with the comparison examples 1 and 2 by resonating the oscillators 112A in the second area Ar2 as shown in table 2 and FIG. 8. In particular, in the ultrasonic wave sensor 10A according to the second embodiment, it is possible to transmit the ultrasonic wave with the sound pressure of 5.77 times that in the comparison example 1 by disposing the plurality of transmitter-receivers Ch including the first area Ar1 and the second area Ar2 in the X direction.

On the other hand, the ultrasonic wave sensor 10A according to the second embodiment has the same number of drive elements as the ultrasonic wave sensor 91 according to the comparison example 2 as can be understood from the comparison of the comparison example 2 and the second embodiment. That is, it is possible to drive the ultrasonic wave sensor 10A according to the second embodiment with the same drive characteristics as in the case where the ultrasonic wave sensor 91 according to the comparison example 2 is driven. It is unnecessary to incorporate a complicated circuit configuration and expensive power supply and transmission circuit, and thus it is possible to achieve cost reduction.

Action Effect of Embodiment

In the embodiment, the plurality of transmitter-receivers Ch are provided along the X direction. That is, the plurality of first areas Ar1 are disposed along the X direction, and the two second areas Ar2 are provided between the two first areas Ar1 adjacent in the X direction. The element pitch of the second area Ar2_+ disposed on the first area Ar1_+ side of the +X side among the two second areas Ar2 is reduced as separated from the first area Ar1_+. Further, the element pitch of the second area Ar2_ disposed on the first area Ar1_ side of the −X side is reduced as separated from the first area Ar1_.

Therefore, it is easy for each oscillator 112A in the second area Ar2 to resonate by the driving of the adjacent first area Ar1, and it is possible to suppress the resonance by the driving of other first areas Ar1. With such a configuration, when each transmitter-receiver Ch is independently driven, it is possible to suppress the influence of the mechanical crosstalk by other transmitter-receivers Ch.

Further, when each first area Ar1 is driven at the same time, the oscillators 112A in the second area Ar2 disposed in the periphery thereof resonate in addition to each first area Ar1. Therefore, it is possible to transmit the ultrasonic wave with high sound pressure as compared with the ultrasonic wave sensors 90 and 91 according to the comparison examples 1 and 2 and the ultrasonic wave sensor 10 according to the first embodiment.

In the ultrasonic wave sensor 10A according to the embodiment, the distance between the two adjacent second areas Ar2, that is, the distance between the adjacent transmitter-receivers Ch is larger than the maximum value of the element pitch in the second area Ar2.

Therefore, in the case where each transmitter-receiver Ch is independently driven and the like, it is possible to suppress the trouble that the oscillators 112A of other transmitter-receivers Ch resonate due to the mechanical crosstalk. Accordingly, it is possible to transmit the ultrasonic wave to a desired position by driving only an area to be driven of the ultrasonic wave sensors 10A.

In the ultrasonic wave sensor 10A according to the embodiment, the element pitch in the X direction is larger than the element pitch in the Y direction in the second area Ar2. In this manner, the element pitch in the Y direction where the oscillation due to the mechanical crosstalk is difficult to propagate is reduced. Therefore, each oscillator 112A in the second area Ar2 can resonate with uniform oscillation amplitude and thus it is possible to transmit the uniform ultrasonic wave in a plane from the ultrasonic wave sensor 10A.

Modification Example

The invention is not limited to each embodiment described above and modification examples. The invention includes modifications and improvements within a range in which the purpose of the invention can be achieved and configurations obtained by appropriately combining each embodiment and the like.

The lower electrode 121 of each ultrasonic wave transducer Tr in the second area Ar2 is not connected to the drive circuit 30 in the first embodiment, but the invention is not limited thereto.

Each lower electrode 121 of each ultrasonic wave transducer Tr in the second area Ar2 may be connected to the drive circuit 30 by wiring different from each ultrasonic wave transducer Tr in the first area Ar1. In this case, the switching circuit 32 may connect the ultrasonic wave transducers Tr in the first area Ar1 and the transmission circuit 33 in the transmission connection and may disconnect the ultrasonic wave transducers Tr in the second area Ar2 and the transmission circuit 33. Accordingly, each oscillator 112A in the second area Ar2 can oscillate by the resonance without degrading the drive characteristics and thus it is possible to increase the sound pressure of the transmitted ultrasonic wave.

Further, with such a configuration, the switching circuit 32 may connect both the ultrasonic wave transducers Tr in the first area Ar1 and the ultrasonic wave transducers Tr in the second area Ar2 to the reception circuit at the time of receiving the ultrasonic wave. In this case, it is possible to perform a reception process based on an added reception signal obtained by adding the reception signal from each ultrasonic wave transducer Tr. The reception signal to be output from each ultrasonic wave transducer Tr when the ultrasonic wave is received is small as compared with the drive signal and thus is susceptible to noise and the like. On the contrary, it is possible to increase signal intensity of the reception signal by adding the reception signals from the ultrasonic wave transducers Tr in the first area Ar1 and the second area Ar2 and thus to suppress the influence of the noise and the like.

In the first embodiment and the second embodiment, the second area Ar2 is provided so as to surround the periphery of the first area Ar1. On the contrary, the second area Ar2 may be provided only on the ±X sides of the first area Ar1 or the second area Ar2 may be provided on any of the ±X sides. Further, the second area Ar2 may be provided only on the ±Y sides of the first area Ar1 or the second area Ar2 may be provided on any of the ±Y sides.

In the second embodiment, the plurality of first areas Ar1 are provided in the X direction with the first direction as the X direction, and the two second areas Ar2 are provided between the adjacent first areas Ar1 (the plurality of transmitter-receivers Ch are disposed in the X direction). On the contrary, the plurality of transmitter-receivers Ch may be disposed in the Y direction with the first direction as the Y direction. Further, the transmitter-receivers Ch may be disposed in both the X direction and the Y direction.

In the second embodiment, the dimension between the second area $Ar2_-$ and the second area $Ar2_+$ is $W_0$, and further the dimension between the second area $Ar2_-$ and the second area $Ar2_+$ is larger than the maximum element pitch ($W_{1X}$ in the example in FIG. 6) in the second area Ar2. However, the invention is not limited thereto.

For example, the dimension between the second area $Ar2_-$ and the second area $Ar2_+$ may be larger than $W_{4X}$ (for example, dimension between $W_{4X}$ to $W_{3X}$) as long as the propagation of the oscillation between the second area $Ar2_-$ and the second area $Ar2_+$ is suppressed. Even in the case, it is possible to suppress the propagation of the oscillation as compared with a case where the dimension between the second area $Ar2_-$ and the second area $Ar2_+$ is $W_{4X}$ or less. Further, the thickness dimension of the damper layer 13 laminated between the second area $Ar2_-$ and the second area $Ar2_+$ of the oscillating plate 112 may be made thicker than the thickness dimension of other portion of the damper layer 13 to suppress the oscillation propagation between the second area $Ar2_-$ and the second area $Ar2_+$.

The damper layer 13 is provided in the first embodiment, but the damper layer 13 may be not provided. Since the damper layer 13 suppresses the oscillation propagation due to the mechanical crosstalk through the oscillating plate 112, it is possible to easily propagate the oscillation from the first area Ar1 to the second area Ar2 and to increase the oscillation of the oscillator 112A by the resonance by excluding the damper layer 13.

On the other hand, in a case where the easiness of the propagation of the oscillation is different between the X direction and the Y direction as in the second embodiment, the damper layer 13 may be provided in a direction where the propagation of the oscillation is desired to be suppressed or the thickness dimension of the damper layer 13 may be changed. For example, in the second embodiment, a damper layer having thickness D1 elongated in the X direction is provided along disposition positions of the ultrasonic wave transducers Tr of $Y=j+1$ to $Y=M-j$ where the first area Ar1 is provided. On the other hand, a damper layer having thickness D2 (<D1) elongated in the X direction is provided along disposition positions of the ultrasonic wave transducers Tr of $Y=1$ to $Y=j$ and $Y=M-j+1$ to $Y=M$. With such a configuration, it is easy for the oscillation to propagate in the Y direction as compared with the X direction.

Further, the thickness of the damper layer 13 may be increased between respective transmitter-receivers Ch as described above. In this case, it is possible to suppress the propagation of the oscillation between respective transmitter-receivers Ch.

The distance measurement device 100 is exemplified as an example of the ultrasonic wave device in the first embodiment, but the invention is not limited thereto. For example, an ultrasonic wave measurement device that measures the inner tomogram of a structure according to a transmission-reception result of the ultrasonic wave or the like may be employed.

In addition, a specific structure when implementing the invention may be a configuration of appropriately combining each embodiment and the modification examples described above within the range in which the purpose of the invention can be achieved, or may be appropriately changed to other structures and the like.

The entire disclosure of Japanese Patent Application No. 2018-061555, filed Mar. 28, 2018 is expressly incorporated by reference herein.

What is claimed is:

1. An ultrasonic wave sensor comprising:
   an oscillating plate including a plurality of oscillators;
   a wall portion provided on the oscillating plate and surrounding the oscillator; and
   a piezoelectric element provided on each of the plurality of oscillators,
   wherein in the oscillating plate, a plurality of piezoelectric elements are electrically connected in plan view as viewed from a thickness direction, and a first area configured to input and output a drive signal to the piezoelectric element and a second area which is provided on an outer side of the first area and where the piezoelectric element is electrically insulated from the piezoelectric element disposed in the first area are included, and
   wherein in the second area, a distance between the adjacent oscillators is reduced as separated from the first area.

2. The ultrasonic wave sensor according to claim 1,
   wherein a plurality of first areas are disposed along the first direction,
   wherein two second areas arranged in the first direction are disposed between two first areas adjacent in the first direction, and
   wherein in the two second areas, the distance between the oscillators is reduced as separated from the first area disposed on a plus side of the two first areas in the second area disposed on the plus side in the first direction, and the distance between the oscillators is reduced as separated from the first area disposed on a minus side of the two first areas in the second area disposed on the minus side in the first direction.

3. The ultrasonic wave sensor according to claim 2,
   wherein a distance between the two adjacent second areas is larger than the distance between the oscillators disposed in the second area.

4. An ultrasonic wave device comprising:
   the ultrasonic wave sensor according to claim 3; and
   a drive circuit that inputs the drive signal to the piezoelectric element in the first area.

5. The ultrasonic wave sensor according to claim 2,
   wherein the second area is provided surrounding the first area, and
   wherein a distance between the oscillators adjacent in a second direction intersecting the first direction is smaller than the distance between the oscillators adjacent in the first direction in the second area.

6. An ultrasonic wave device comprising:
   the ultrasonic wave sensor according to claim 4; and
   a drive circuit that inputs the drive signal to the piezoelectric element in the first area.

7. An ultrasonic wave device comprising:
   the ultrasonic wave sensor according to claim 2; and
   a drive circuit that inputs the drive signal to the piezoelectric element in the first area.

8. An ultrasonic wave device comprising:
   the ultrasonic wave sensor according to claim 1; and
   a drive circuit that inputs the drive signal to the piezoelectric element in the first area.

* * * * *